Aug. 30, 1932.  W. SCHARFF  1,875,163

CUTTER GRINDER

Filed Jan. 24, 1930

Inventor:
Willy Scharff
by Kinchaver
Atty.

Patented Aug. 30, 1932

1,875,163

UNITED STATES PATENT OFFICE

WILLY SCHARFF, OF FRANKFORT-ON-THE-MAIN, GERMANY

CUTTER GRINDER

Application filed January 24, 1930, Serial No. 423,141, and in Germany January 24, 1929.

My invention relates to cutter grinders. It is an object of my invention to eliminate certain drawbacks of the grinders as designed heretofore, as will be described below.

To the end of eliminating the said drawbacks, I provide in combination with the means for imparting rotation to the cutter, means for subdividing the constant feed-in per revolution into as many partial feed-in operations as there are teeth in the cutter.

It has already been suggested to effect a certain amount of in-feed between the grinding wheel and the cutter as often as the feeding mechanism has been operated. This expedient, however, involves the drawback that the total amount of in-feed per revolution of the cutter varies with the number of teeth in the cutter. On the other hand it is necessary that the chip thickness and the make-up for the wear of the grinding wheels should be constant per revolution of any cutter, that is independent of the number of its teeth, in order to obtain a constant feed-in. In the existing machines this can only be effected by a very complicated and tedious adjusting which must be repeated whenever a cutter having another number of teeth is ground.

The drawbacks of the existing machines are eliminated according to my invention. I provide an automatic grinder in which the exact position of the tooth at the grinding station is determined by a check or pawl and in which the working time is exclusively utilized for feeding and grinding. Objectionable acceleration impulses connected with the rotation of the cutter are eliminated, and the constant in-feed per revolution of a given cutter is subdivided into as many partial feed-in operations as there are teeth in the cutter.

In the drawing affixed to this specification and forming part thereof an automatic cutter grinder embodying my invention is illustrated diagrammatically by way of example.

Figure 1:
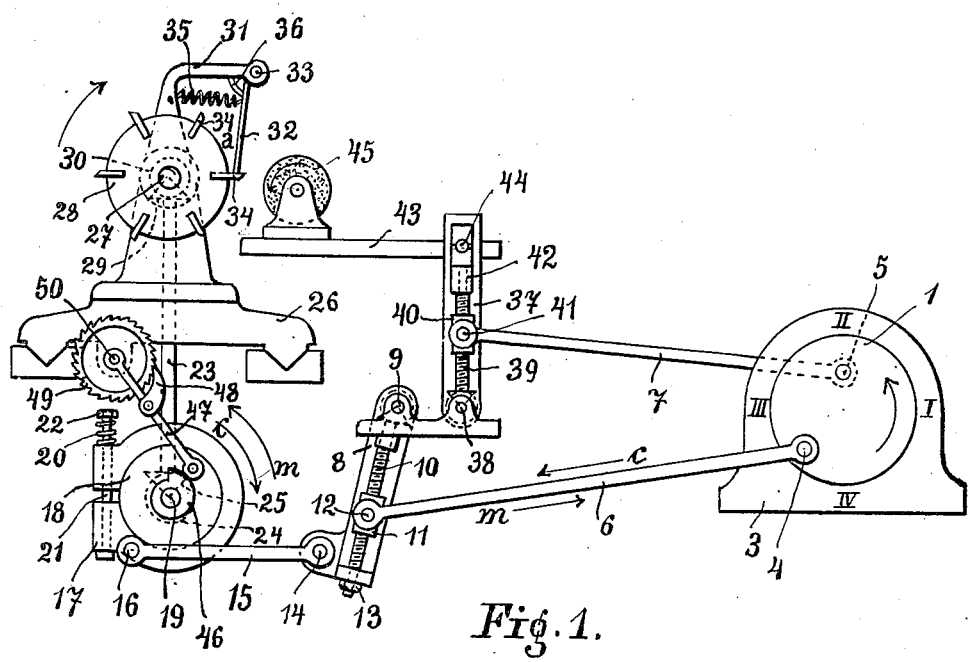
Fig. 1 is a diagrammatic elevation of the complete plant.
Figure 2:
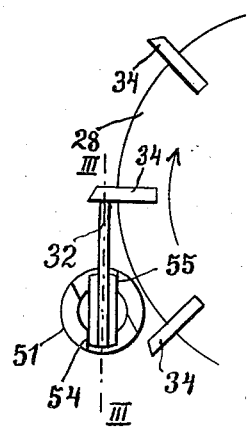
Fig. 2 is an end elevation of a pawl connected with the subdividing mechanism aforesaid.

Referring now to the drawing and first to Fig. 1, a crank disc 1 is mounted to rotate in a suitable bearing block 3 and rotation is imparted to the disc in anti-clockwise direction, as indicated by the arrow. The means for rotating the disc 1 must not be a central shaft but some mechanism engaging its perimeter, for a reason which will presently become apparent. Any suitable means, not shown, may be provided for rotating the disc in this manner, for instance, it may be designed as a spur gear or a worm wheel, with a pinion or a worm for rotating it. 4 and 5 are crank pins on the disc 1 to which connecting rods 6 and 7, respectively, are connected. 8 is a link which is fitted to rock about a pivot 9 in the frame of the machine, 10 is a threaded spindle on the rocking link, 11 is a nut on the spindle, 12 is a trunnion on the nut to which the rod 6 is linked, and 13 is a nut for rotating the spindle so as to vary the effective arm of the rod with respect to the link 8. 14 is a pin at the end of the link, 15 is a connecting rod, which is pivoted to the pin 14, and 16 is a pivot on a friction clutch 17 on which the other end of the rod 15 is placed. The friction clutch 17 is seated on a friction plate 18 which is keyed on a shaft 19. Means for regulating the pressure which the clutch 17 exerts on the plate 18 may be provided, for instance, a spring 20 on a pin 21 which connects the ends of the split clutch 17 and is provided with a nut 22 for regulating the pressure of the spring 20. 23 is a vertical shaft which is connected with the shaft 19 by bevel gearing 24 and 25, 26 is a carriage on which a chuck 27 for the cutter 28 is carried and 29, 30 is a pair of bevel gears by which the chuck 27 is rotated from the shaft 19. Means must obviously be provided for rotating the chuck without interference on the part of the reciprocating carriage. Such means are old in the art and therefore will not be described. 31 is an arm extending upwards from a standard on the carriage, 32 is a pawl which is fulcrumed in the arm at 33 and adapted to engage the teeth 34 of the cutter 28, 35 is a spring tending to move the pawl toward the cutter, and 36 is a check on the pawl which limits its inward movement.

37 is a link which is fitted to rock in the frame of the machine at 38 and is equipped with a spindle 39, a nut 40 to which the rod 7 is pivoted at 41, and a nut 42 for rotating the spindle, as and for the purpose described with reference to the link 8. 43 is a grinding wheel slide to which the link 37 is connected at 44, and 45 is the grinding wheel on the grinding wheel slide.

The means for feeding the carriage 26 comprise a spiral cam 46 on the shaft 19, a ratchet lever 47 which is reciprocated by the cam 46, a ratchet pawl 48, and a ratchet wheel 49 on a threaded spindle 50 by which feeding motion is imparted to the carriage 26.

The operation of my automatic grinder is as follows:- In the position illustrated in Fig. 1, the crank pin 4 of the rod 6 is shown intermediate the positions III and IV, and the crank pin 5 of the rod 7 intermediate the positions I and II. When the crank pin 4 upon further rotation of the disc 1 moves from the position I into the position III past the position II, the rod 6 is moved in the direction of the arrow c. This movement is transmitted to the friction clutch 17 through the mechanism described, rotating the clutch in the direction c. Rotation is imparted to the shafts 19 and 23 and to the chuck 27 on which the cutter 28 has been secured. The cutter as illustrated is of the inserted teeth type but obviously I am not limited to this type. The cutter is rotated in the direction of the arrow f, the rotation imparted per stroke of the link 11 being somewhat in excess of the pitch of its teeth 34. The exact angle through which the cutter is rotated, is determined by rotating the spindle 10 so as to vary the effective radius of the link 8. It will be understood that the effective radius may be varied without disassembling any parts of the machine and even while the disc 1 rotates, by operating the nut 13. When the cutter rotates the succeeding tooth 34a pushes aside the pawl 32 which under the action of its spring 35 returns to the initial position determined by the check 36 as soon as it is released by the tooth 34a. At the same time feeding motion is imparted to the carriage 26 from the cam 46, as described.

The disc now rotates from position III past position IV back to position I, reversing the movement of the rod 6 and the rotation of the clutch 17, as indicated by the arrows m, and also reversing the cutter. As mentioned, the rotation imparted to the cutter is somewhat in excess of its pitch and therefore after the rotation in the direction f had been completed, the tooth 34a had moved somewhat beyond the end of the pawl 32. When the direction of rotation is reversed, the tooth is moved into engagement with the pawl 32 and held in firm contact therewith against the force exerted by the friction clutch which may be regulated by means of the spring 20 and the nut 22. The slide 34 with the wheel 45 now advances and performs the grinding operation during the rotation of the disc 1 from III to I. When the disc has returned into the position I the parts are ready for another cycle.

The stroke of the slide 43 is adjusted by means of the spindle 40 in accordance with the pitch of the cutter 28, and means, not shown, may be provided for effecting this regulation during the operation of the machine.

By the action of the spiral cam and the mechanism connected therewith, the thickness of the chip which must be maintained constant for each revolution of the cutter plus the in-feed provided for making up for the wear of the grinding wheel are balanced for each tooth of the cutter. This subdivision of the total feed of the cutter per revolution into parts of a revolution automatically adapts itself to the number of teeth of the cutter without exchanging any parts of the machine.

Figure 3:
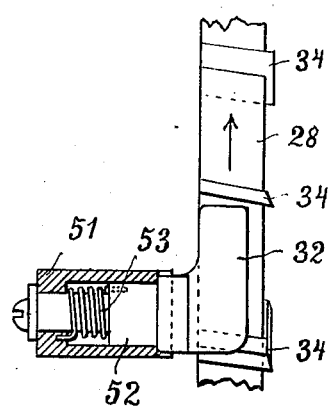
Fig. 3 is a section on the line III—III in Fig. 2.

Referring now to Figs. 3 and 4, these illustrate a modified construction of the pawl 32. 51 is a bearing which is secured in a suitable position on the carriage 26, 52 is a pin which is fitted to rotate in the bearing, 53 is a spring which tends to rotate the pawl toward the cutter 28, and 54, 55 are checks on the bearing 51 which limit the rotation of the pawl, similarly to the check 36 in Fig. 1. This arrangement of the pawl is preferred as it combines rigidity with complete protection of all moving parts against the emery and steel dust.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A cutter grinder comprising a carriage, a chuck on said carriage for holding a cutter, means for rotating said chuck and for feeding-in said carriage, means for presenting a grinding wheel to said cutter, a continuously rotating member for actuating all said means, a mechanism connecting said member to said chuck-rotating and feeding-in means, a mechanism connecting said member to said grinding-wheel presenting means, and an adjustable part in said first-mentioned mechanism.

2. A cutter grinder comprising a carriage, a chuck on said carriage for holding a cutter, means for rotating said chuck and for feeding-in said carriage, means for presenting a grinding wheel to said cutter, a continuously rotating member for actuating all said means, a mechanism connecting said member to said chuck-rotating and feeding-in means, a mechanism connecting said member to said grinding-wheel presenting means, a rocker forming part of each mechanism, a threaded spindle on said rocker, a nut on said spindle which is connected to said member and to the means, to which the mechanism corresponds, and means for rotating said spindle.

3. A cutter grinder comprising a carriage, a chuck on said carriage for holding a cutter, means for rotating said chuck and for feeding-in said carriage, means for presenting a grinding wheel to said cutter, a continuously rotating member for actuating all said means, a mechanism connecting said member to said chuck-rotating and feeding-in means, a mechanism connecting said member to said grinding-wheel presenting means, an adjustable part in each mechanism, and a friction clutch intermediate said chuck-rotating means and said adjustable part.

In testimony whereof I affix my signature.

WILLY SCHARFF.